March 26, 1929.  M. T. GEYSER  1,707,003
TAIL LIGHT FOR VEHICLES
Filed Sept. 8, 1927
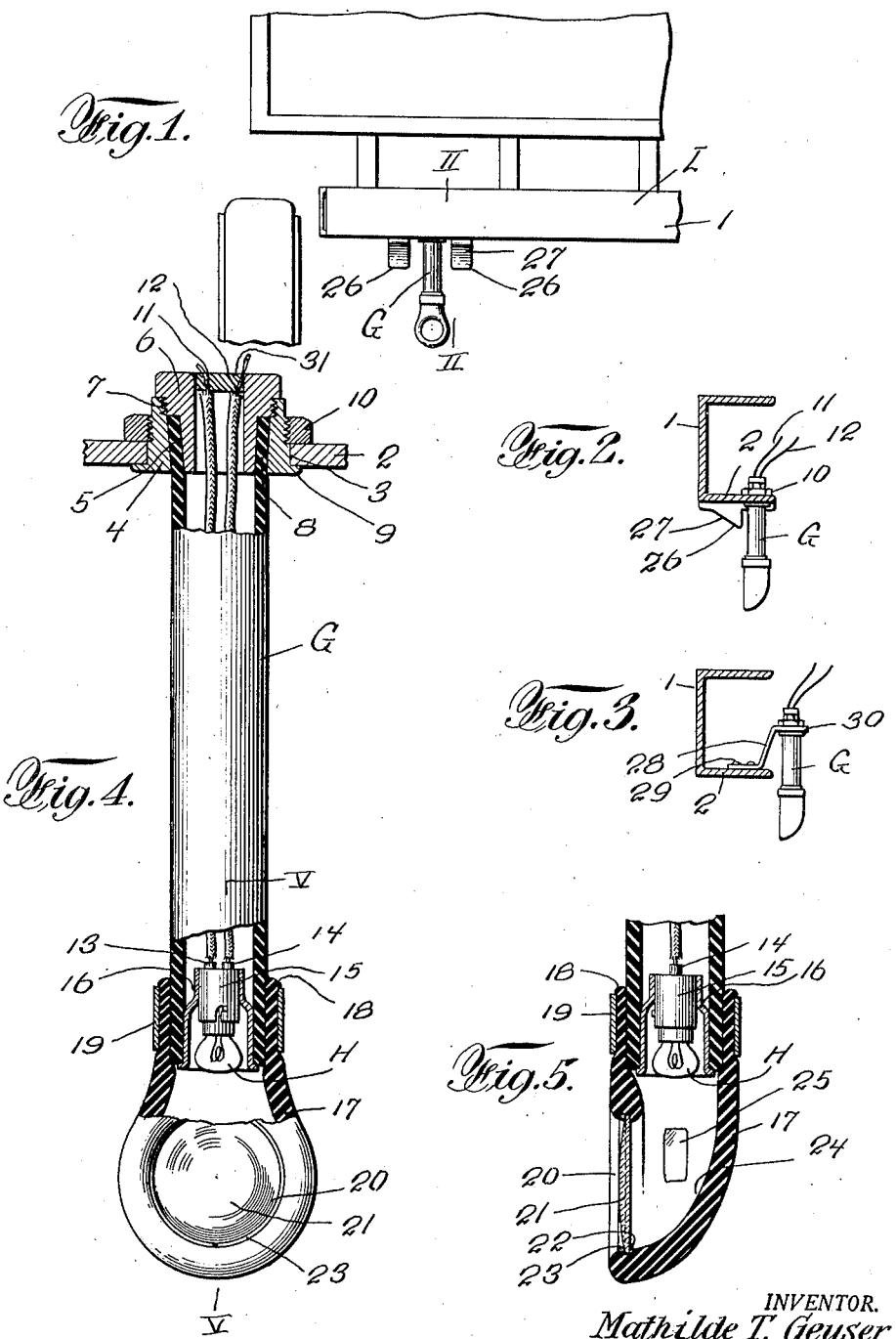
INVENTOR.
Mathilde T. Geyser
ATTORNEYS Patented Mar. 26, 1929.

1,707,003

UNITED STATES PATENT OFFICE.

MATHILDE T. GEYSER, OF NEW YORK, N. Y.

TAIL LIGHT FOR VEHICLES.

Application filed September 8, 1927. Serial No. 218,197.

This invention relates to tail lights for vehicles, and an object of the invention is to provide a tail light which will be attractive and efficient for its purpose and which will be unlikely to be injured in the ordinary daily use of the vehicle to which it is attached.

A further object is to provide a tail light which will be strong and substantial and which may be readily and conveniently attached in a position of use.

A more detailed object is to provide a tail light embodying a flexible arm-like structure adapted to be fastened by one end to the vehicle and having its opposite or free end illuminated, the whole being of such material as to be readily flexible so as to yield without injury if and whenever struck by or forced against a foreign object.

A further and more specific object is to provide means for preventing likelihood of the flexible extending part of the present device being sheared off adjacent its point of attachment to the vehicle.

A further object is to so construct the device as to render it water proof as well as proof against the entrance of dust and dirt.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention :—

Fig. 1 is a rear elevational view of a portion of a vehicle, such as an ordinary delivery truck, showing a tail light applied thereto constructed in accordance with this invention.

Fig. 2 is a detail transverse sectional view taken substantially upon the plane of line II—II of Fig. 1.

Fig. 3 is a similar sectional view illustrating a modified manner of mounting the tail light.

Fig. 4 is an enlarged front elevational view of a tail light constructed in accordance with this invention portions being illustrated in vertical section for better disclosing the construction thereof and the manner of attachment to the vehicle, and Fig. 5 is a similarly enlarged vertical sectional view taken substantially upon the plane of line V—V of Fig. 4.

Referring to the drawing for describing in detail the structure illustrated therein, the reference character L indicates any kind of a vehicle to which it is desired a tail light should be applied, for instance a delivery truck. A rear cross beam as 1 is illustrated as a convenient part of this vehicle whereto to attach the tail light comprising the invention. As illustrated this cross beam is of channel shape, such as is customary in truck structure, providing a lower horizontal flange as 2 which affords a convenient part to which to directly attach the tail light. This flange is provided with an aperture as 3 therethrough and through this aperture is fitted the upper end or attachment part of the tail light.

In the form of the device as illustrated the attachment part thereof consists of an outer collar 4 which has an upwardly flaring central bore 5. A tubular wedge-like sleeve 6 is arranged partly within the bore 5 and has threaded engagement as at 7 with the collar so that the lower or tapered portion of said sleeve 6 may be forced downwardly and into such relation with the bore 5 as to produce a strong clamping action against the interposed upper end portion as 8 of the main body part G of the tail light structure.

The collar 4 has a bottom flange 9 thereon adapted to engage against the under-surface of the flange 2 of the cross beam, and a clamp nut as 10 is threaded upon the collar adapted to engage the upper-surface of the flange 2 for thereby retaining the collar firmly connected with the flange 2 in use.

The main body G may be of any construction but is herein conveniently illustrated as consisting of a length of rubber tubing fastened by its upper annular end between the collar 4 and the sleeve 6 and as depending straight downwardly from its point of attachment, being hollow and thereby constituting an efficient insulating conduit for the necessary conductor wires as 11 and 12 which extend downwardly thereinto through the hollow of the sleeve 6, the lower ends of said conductor wires being attached to the terminals as 13 and 14 which are carried by a socket member 15 of the usual and well known type adapted to removably hold and provide electrical connection for a bulb as H of the usual form and construction.

The socket member 15 is fixed to and carried by a metallic sleeve as 16 which is fixedly attached within the lower end of the body G so as to constitute a metallic liner at the lower end of said body. The socket is disposed so as to support the bulb almost wholly within this sleeve or liner, the liner being preferably polished on its inner surface for reflecting purposes to assist in transmitting the light rays from the bulb downwardly. At the same time said liner serves to positively and efficiently guard the relatively fragile bulb against likelihood of injury at all times, it being here noted that the presence of the resilient material of the body G surrounding the sleeve constitutes a protecting cushion about the sleeve further enhancing the protective value of the sleeve with respect to the bulb.

Continuing downwardly below the sleeve 16 and bulb H is a terminal portion 17. This may be of the same or similar material as the body G, and in fact it may if desired be formed integral therewith. In the instance illustrated this terminal portion is shown as being of moulded rubber formed separately from the body G but having its upper annular end portion as 18 telescoping about the lower end of the body and about the sleeve 16, a clamp ring as 19 being shown as clamping said upper annular end portion 18 against the body and sleeve to thereby hold all of said parts firmly and securely assembled, the sleeve having been inserted through the body, the portion 18 having been applied over the body and the ring 19 having been then drawn tight about the whole.

The presence of the annular portion 18, and of the clamp ring 19 gives additional protective value for the bulb H.

Below the plane of the bulb the portion 17 is enlarged and provided with an annular bull's-eye opening as 20 within which is fitted a suitable transparent glass or other similar element as 21, said glass having its annular portion engaging within an annular groove 22 of the member 17 and removably held by a metallic spring ring as 23 so that it may be taken out whenever necessary to inspect or renew the bulb H.

Behind the opening 20 the rear interior wall as 24 of the portion 17 is curved to best reflect the rays of light from the bulb outwardly through the opening 20, and this surface may if desired be coated or supplied with any appropriate form of reflecting material, such as a white elastic paint, enamel, or other form of reflector.

The portion 17, constituting as it does a considerable bulk of flexible material, such as moulded rubber, provides a very efficient guard for the lower end of the bulb.

The bull's-eye opening 20 is preferably disposed wholly below the level of the bulb-guarding sleeve, 16 as well as below the bulb, so that any accident shattering the glass 21, or flexing or distorting the portion 17 carrying said glass, will not be likely to injure the bulb.

The glass 21 may if desired be of the non-breakable type now in commercial use, or it may consist of a sheet of celluloid or other flexible transparent material.

One or more side light openings as 25 may be provided through the portion 17 as may be necessary or desirable and these openings may be closed with material similar to that employed in the bull's-eye opening 20.

As a means to prevent the possibility of shearing off of the body G adjacent its point of attachment to the cross beam flange 2 of the vehicle, as for instance while the vehicle is being backed against a loading platform, one or more guard members as 26—26 may be provided fixed to the under-surface of the flange 2 or other adjacent part of the vehicle and providing an inclined surface as 27 adjacent the body G in such relation that the surface 27 would either depress the loading platform or other obstruction or elevate the cross beam 1, in either instance insuring that the point of impact of the loading platform against the body G will be spaced sufficiently downwardly from the flange 2 to permit the body G to be readily flexed and to thereby absorb the blow without injury.

In the modification illustrated in Fig. 3 a simple arrangement is disclosed which may be usuable in many instances to serve the same purpose as the guard members 26. It this figure it is suggested that a bracket member as 28 may be employed attached by one end as at 29 to a part of the vehicle, as for instance the cross beam 1, and having its other end, as 30, disposed to receive the attachment part of the present tail light structure and hold the structure in such relation to a substantial part of the vehicle, as for instance the cross beam 1, that only the lower end portion of the tail light structure is exposed beneath the mentioned part of the vehicle, the upper portion of the tail light structure being in a guarded position behind the vehicle part.

It will be understood that the end 30 of the bracket 28 may have an opening therethrough for accommodating the attachment part of the tail light structure in the same manner as hereinabove described with respect to the flange 2, but it will nevertheless be understood that the particular type or form of attachment part herein shown and described is merely exemplary, as any other means of attaching the upper end of the flexible body G may be employed as may be found expedient.

As herein suggested it is a purpose of this invention to provide a tail light structure of the type indicated and which is water proof as well as proof against the entrance of dust and dirt thereinto, and to this end the drawing illustrates a closure member as 31 at the upper end of the attaching part said closure member being of such construction as to permit passage of the conductors 11 and 12 but otherwise completely sealing the upper end of the body G, it being noted that the lower end of the body is completely closed and rendered water, dust and dirt proof by the parts already described.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A tail light comprising an elongated flexible body, means at one end of said body by which to attach the body to a suitable support, the body being flexible and hollow, a metallic stiffening sleeve inserted within the hollow of the body at the opposite end thereof, and a lamp disposed within said sleeve protected thereby, and a flexible conductor extending through the hollow of said flexible body to said lamp.

2. The combination with a tail light comprising an elongated flexible body having attaching means at one end part thereof by which it may be connected with a suitable support and having a lamp arranged at another part thereof spaced from said attaching means so that the lamp is yieldably supported from said attaching means, of guard means arranged to protect the elongated flexible body adjacent its point of attachment to the support.

3. In a tail light comprising an elongated flexible body having attaching means at one end part thereof by which it may be connected with a suitable support and having a lamp arranged at another part thereof spaced from said attaching means so that the lamp is yieldably supported from said attaching means, the combination therewith of a support comprising means constituting a guard to shield the flexible body adjacent its point of attachment to the support.

4. A tail light comprising a member of general tubular form, means at one end of said member by which to attach it to a suitable support, said member being flexible and resilient so as to be temporarily yieldable and deformable under stress and being closed at its other end but having an opening through its side wall adjacent said other end, and a lamp within said member arranged longitudinally thereof out of the plane of said opening.

5. A tail light comprising a member of general tubular form, means at one end of said member by which to attach it to a suitable support, said member being flexible and resilient so as to be temporarily yieldable and deformable under stress, a lamp arranged within the hollow of said member adjacent the end thereof opposite the attaching end, and flexible conductors extending from said lamp loosely through the length of said member, said conductors continuing out of the attaching end of said member.

In testimony whereof I affix my signature.

MATHILDE T. GEYSER.